(12) United States Patent
Kang

(10) Patent No.: US 9,930,606 B2
(45) Date of Patent: Mar. 27, 2018

(54) METHOD OF EXPANDING BEACON SERVICE COVERAGE, AND APPARATUS AND SYSTEM THEREFOR

(71) Applicant: SK Planet Co., Ltd., Gyeonggi-do (KR)

(72) Inventor: Kichon Kang, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/337,574

(22) Filed: Oct. 28, 2016

(65) Prior Publication Data
US 2017/0127336 A1    May 4, 2017

(30) Foreign Application Priority Data
Oct. 30, 2015 (KR) .................. 10-2015-0152404

(51) Int. Cl.
*H04W 24/00* (2009.01)
*H04W 40/24* (2009.01)
*H04B 17/318* (2015.01)
*H04W 88/02* (2009.01)

(52) U.S. Cl.
CPC ........ *H04W 40/244* (2013.01); *H04B 17/318* (2015.01); *H04W 88/02* (2013.01)

(58) Field of Classification Search
CPC ... H04W 40/244; H04W 88/02; H04B 17/318
USPC ............................ 455/456.1–456.3; 370/338
See application file for complete search history.

(56) References Cited

U.S. PATENT DOCUMENTS

2014/0307611 A1* 10/2014 Tesanovic ............ H04W 8/005
370/312
2016/0301539 A1* 10/2016 Lindoff ............... H04L 12/1881

\* cited by examiner

*Primary Examiner* — Marcos Batista
(74) *Attorney, Agent, or Firm* — Fenwick & West LLP

(57) ABSTRACT

Provided is a method of expanding beacon service coverage, more particularly, a beacon service coverage expanding method that may expand beacon service coverage by using a user terminal to perform a beacon function to transmit a beacon signal within a certain coverage, and an apparatus and system therefor. The method of expanding beacon service coverage using the terminal may include receiving a beacon signal transmitted from a beacon device, measuring signal strength of the beacon signal to determine whether to perform a beacon function, and transmitting the beacon signal within a certain service coverage when the terminal determines to perform the beacon function.

6 Claims, 10 Drawing Sheets

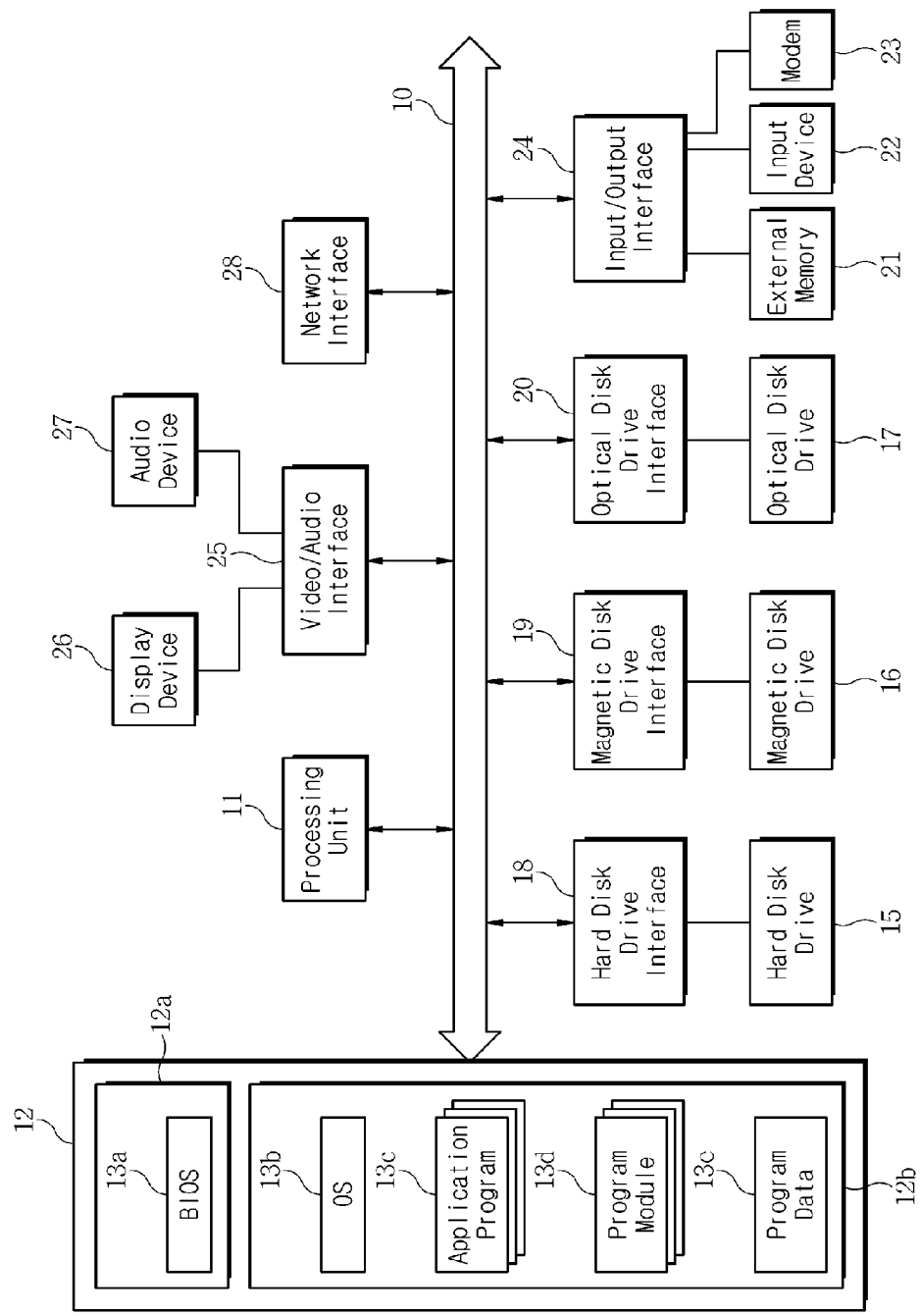

METHOD OF EXPANDING BEACON SERVICE COVERAGE, AND APPARATUS AND SYSTEM THEREFOR

CROSS-REFERENCE TO RELATED APPLICATION

This application claims priority to and the benefit of Korean Patent Application No. 10-2015-0152404 filed in the Korean Intellectual Property Office on Oct. 30, 2015 respectively, the entire contents of which are incorporated herein by reference.

TECHNICAL FIELD

The present invention relates to a method of expanding beacon service coverage, and more particularly, to a beacon service coverage expanding method that may expand beacon service coverage by using a user terminal to perform a beacon function to transmit a beacon signal within a certain coverage, and an apparatus and system therefor.

BACKGROUND

This section is intended to merely provide background for embodiments of the present invention and is not considered prior art in the claims.

With the development of mobile communication networks and the advance in terminal specifications, mobile communication terminals have become a necessity for modern people and have evolved into total entertainment equipment beyond typical simple communication devices or information providing devices.

Such mobile communication terminals have a function for performing short-range wireless communication, such as near field communication (NFC) or Bluetooth, in addition to a communication function through mobile communication networks.

NFC has a short communication distance and requires a separate wireless communication chip. However, Bluetooth has a relatively long communication distance and most terminals are equipped with a Bluetooth communication function. Thus, recently, a beacon service using Bluetooth communication has attracted attention.

A beacon service denotes a service in which a beacon device installed in various places, such as a franchise store, according to a desired purpose transmits a beacon signal to a user terminal positioned within a certain coverage and connects to a user terminal that scans the beacon signal to provide a variety of information to the user terminal, for example, to provide information such as product information, discount coupons, etc. to a user terminal that has entered the store or to confirm the position of the user in the store to provide a location-based service.

In order to provide such a beacon service, beacon devices that transmit beacon signals should be installed in a service region at a certain distance. Furthermore, a beacon device transmits a beacon signal within certain coverage. The coverage in which the beacon device transmits the beacon signal is predetermined, and thus expansion of the coverage inevitably causes an increase in transmission power strength of the beacon device. However, as the transmission power strength of the beacon device increases, battery life of the beacon device may be reduced.

SUMMARY

The present invention is directed to providing a beacon service coverage expanding method that may expand beacon service coverage by using a user terminal to perform a beacon function to transmit a beacon signal within a certain coverage instead of a beacon device, and an apparatus and system therefor.

The present invention is also directed to providing a beacon service coverage expanding method that may perform a beacon function by using a user terminal in a flexible manner to perform the beacon function to transmit a beacon signal within the certain coverage only when strength of the beacon signal received from the beacon device is a predetermined value or less and stopping the beacon function when the beacon signal is no longer received from the beacon device because the terminal exits the service coverage supported by the beacon device, and an apparatus and system therefor.

The present invention is not limited to the above objectives, but other objectives not described herein should be clearly understood by those skilled in the art from descriptions below.

One aspect of the present invention provides a method of expanding beacon service coverage using a terminal, which includes receiving a beacon signal transmitted from a beacon device, measuring signal strength of the beacon signal and determining whether to perform a beacon function, and transmitting a beacon signal within a certain service coverage when the terminal determines to perform the beacon function.

The determining of whether to perform a beacon function may include determining whether the measured signal strength of the beacon signal is a predetermined value or less and determining to perform the beacon function when the measured signal strength of the beacon signal is the predetermined value or less, and determining not to perform the beacon function when the measured signal strength of the beacon signal is not the predetermined value or less.

The determining of whether to perform a beacon function may include determining not to perform the beacon function when a beacon signal including the same beacon identification information as that of the beacon signal transmitted from the terminal is received from another terminal.

The determining of whether to perform a beacon function may include inquiring of the beacon device or a service server about whether to perform the beacon function, and determining to perform the beacon function when a request to perform the beacon function is received from the beacon device or the service server, and determining not to perform the beacon function when the request to perform the beacon function is not received from the beacon device or the service server.

The transmitting of a beacon signal within a certain service coverage may include setting a service coverage when the terminal determines to perform the beacon function and transmitting the beacon signal while adjusting strength of the beacon signal according to the set service coverage.

The method may further include, after the transmitting of a beacon signal within a certain service coverage, determining whether the beacon signal is received from the beacon device and stopping the beacon function when the beacon signal is not received from the beacon device.

The method may further include, after the transmitting of a beacon signal within a certain service coverage, confirming information on a current state, and stopping the beacon function when the terminal determines that the beacon function cannot be performed.

Another aspect of the present invention provides a non-transitory computer-readable recording medium having recorded thereon a program for executing the method of expanding beacon service coverage.

Another aspect of the present invention provides a terminal which includes a communication module configured to scan and detect a beacon signal transmitted from a beacon device and a terminal control module configured to receive the beacon signal transmitted from the beacon device through the communication module, measure signal strength of the received beacon signal to determine to perform a beacon function, and transmit a beacon signal within a certain service coverage when the terminal determines to perform the beacon function.

Another aspect of the present invention provides a beacon system which includes a beacon device configured to transmit a beacon signal to a terminal positioned within a certain service coverage, a plurality of terminals each configured to receive the beacon signal from the beacon device, measure signal strength of the received beacon signal to determine to perform a beacon function, and transmit a beacon signal within a certain service coverage when the terminal determines to perform the beacon function, and a service server configured to determine a terminal that will perform the beacon function from among the plurality of terminals and notify the determined terminal.

Each of the plurality of terminal may measure the signal strength of the received beacon signal and inquire of the service server about whether to perform the beacon function when the signal strength is a predetermined value or less, and the service server may check states of the plurality of terminals, determine a terminal that will perform the beacon function, and notify the determined terminal.

According to the method of expanding beacon service coverage, and the apparatus and system therefor according to an embodiment of the present invention, it is possible to expand beacon service coverage by using a user terminal without increasing the number of beacon devices or increasing a transmission strength of a beacon device to perform a beacon function to transmit a beacon signal within a certain coverage instead of the beacon device.

According to an embodiment of the present invention, it is also possible to perform a beacon function using a user terminal in a flexible manner by performing the beacon function to transmit a beacon signal within a certain coverage only when a strength of the beacon signal received from the beacon device is a predetermined value or less and stopping the beacon function when the beacon signal is no longer received from the beacon device because the terminal exits the service coverage supported by the beacon device.

According to an embodiment of the present invention, it is possible to efficiently expand beacon service coverage by selecting a terminal that will perform a beacon function according to situations between a plurality of terminals which are positioned within the service coverage of the beacon device.

Various effects other than those described above may be disclosed directly or indirectly in the detailed description according to the following embodiments of the present invention.

BRIEF DESCRIPTION OF DRAWINGS

FIG. 10 is a view showing an operating environment of an apparatus for supporting expansion of beacon service coverage according to an embodiment of the present invention.

DETAILED DESCRIPTION

Figure 1:
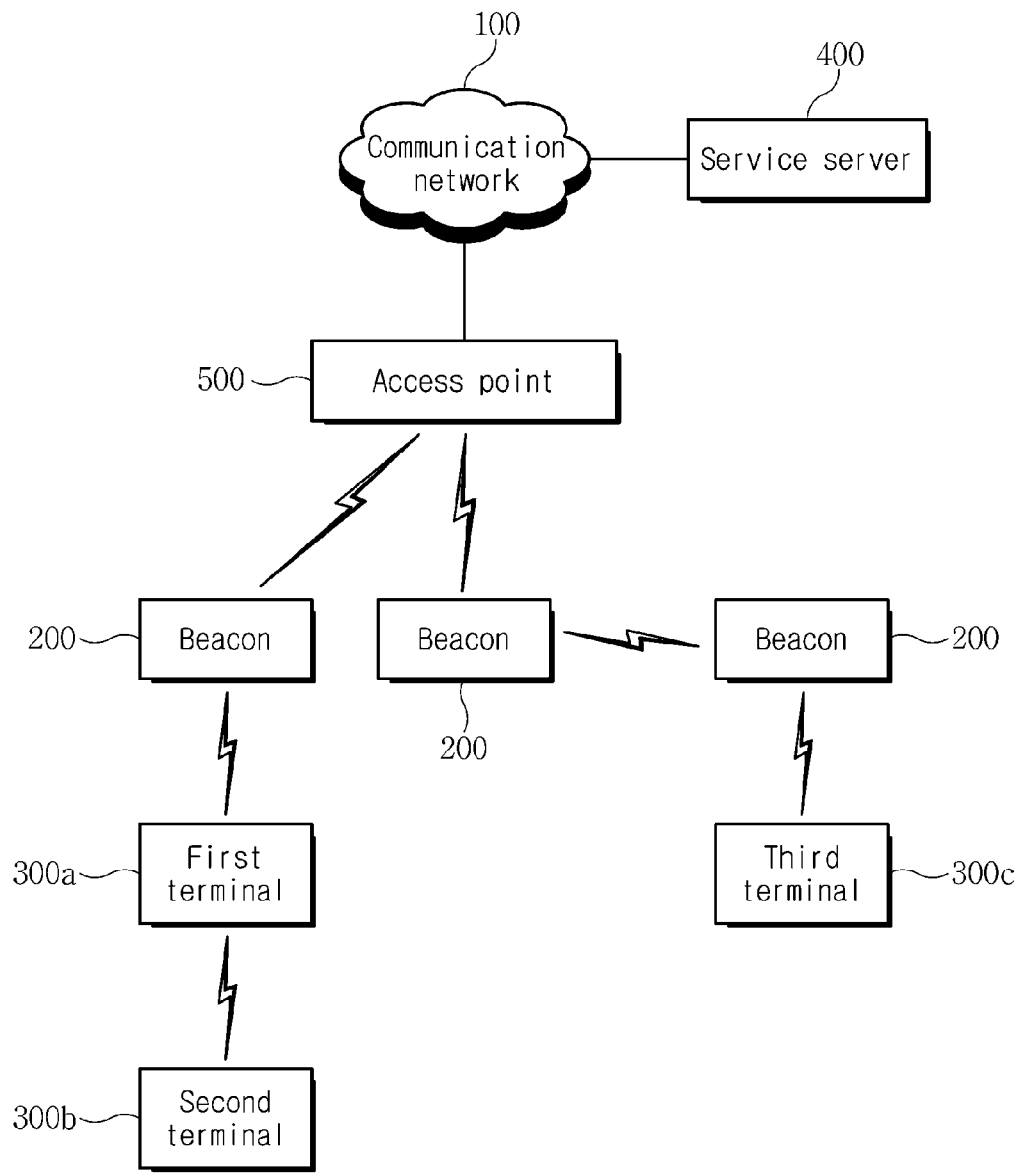
FIG. 1 is a block diagram schematically showing a beacon system according to an embodiment of the present invention.

Hereinafter, exemplary embodiments of the present invention will be described in detail with reference to the accompanying drawings. The features and advantages of aspects of the present invention will become more apparent from the detailed description set forth below.

However, detailed descriptions related to well-known functions or configurations will be ruled out in order not to unnecessarily obscure the subject matter of the present invention. In addition, it should be noted that like reference numerals denote like elements throughout the specification and drawings.

The terms or words used in the following description and drawings should not be construed as being limited to typical or dictionary meanings, but should be construed as the meaning and concept corresponding to the technical idea of the present invention on the basis of the principle that an inventor can appropriately define the concept of the term for describing his or her invention in the best manner. Accordingly, the configurations illustrated in embodiments and drawings described in the specification do not represent the technical idea of the present invention but are just exemplary embodiments. Thus, it should be understood that various equivalents and modifications may exist and be used as substitutes at the time of filing.

While the terms including ordinal numbers, such as "first," "second," etc. may be used herein to describe various elements, such elements are not limited to those terms. The terms are only used to distinguish one element from another. For example, a first element may be named a second element without departing from the scope of the present invention and the second element may also be similarly named the first element.

It should be understood that when one element is referred to as being "connected to" or "coupled to" another element, it may be connected or coupled logically or physically. In other words, it should be understood that one element may be directly connected or coupled to another element or indirectly connected or coupled to another element with a third element intervening therebetween.

The terms used in the present specification are set forth to explain the embodiments of the present invention, and the scope of the present invention is not limited thereto. An expression used in the singular encompasses the expression of the plural unless it has a clearly different meaning in context. It should be further understood that the terms "include," "comprise," or "have" used in this specification, specify the presence of stated features, steps, operations, components, parts, or combinations thereof, but do not preclude the presence or addition of one or more other features, numerals, steps, operations, components, parts, or combinations thereof.

Further, embodiments within the scope of the present invention also include computer-readable media for carrying or storing computer-executable instructions and/or data structures. Such computer-readable media can be any available media that can be accessed by a general purpose or special purpose computer system. Thus, by way of example, and not limitation, the computer-readable media can include physical computer-readable storage media including a random access memory (RAM), a read-only memory (ROM), an electrically erasable programmable ROM (EEPROM), a compact disc ROM (CD-ROM) or other optical disk storage, magnetic disk storage or other magnetic storage devices, or any other medium which can be used to store or deliver a desired program code means in the form of computer-executable instructions, computer-readable instructions, or data structures and which can be accessed by a general purpose or special purpose computer.

In the following description and claims, the term "network" is defined as one or more data links that allow electronic data to be transmitted between computer systems and/or modules. When information is transferred or provided over a network or another communications connection (either hardwired, wireless, or a combination of hardwired or wireless) to a computer system, the computer system properly views the connection as a computer-readable medium. Computer-executable instructions include, for example, instructions and data which cause a general purpose computer system or a special purpose computer system to perform a certain function or group of functions. The computer-executable instructions may be, for example, binaries, intermediate format instructions such as an assembly language, or even source code.

Furthermore, those skilled in the art should appreciate that the invention may be practiced in network computing environments with many types of computer system configurations including, personal computers (PCs), laptop computers, hand-held devices, multi-processor systems, microprocessor-based or programmable consumer electronics, network PCs, minicomputers, mainframe computers, mobile telephones, personal digital assistants (PDAs), pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In addition, a beacon service using beacon technology according to an embodiment of the present invention will be described based on Bluetooth Low Energy (BLE) type data communication technology.

While NFC technology may be available only within several tens of centimeters, Bluetooth technology may operate in the range of several tens of meters and thus has been applied to a wide variety of applications. In particular, the Bluetooth technology can transfer data even when a user just passes through a place where a beacon device is installed without needing to approach and touch a reader like in NFC technology, and also can read location movement even inside a building and transfer customized data.

However, the beacon service according to an embodiment of the present invention is not necessarily limited to BLE or Bluetooth. Accordingly, various Personal Area Network (PAN) type short-distance communication technologies such as Zigbee, Ultra WideBand (UWB), advanced network technology (ANT), and Wi-Fi may be available.

Hereinafter, a method of expanding beacon service coverage and an apparatus and system therefor will be described in detail with reference to the accompanying drawings.

First, main elements of a beacon system for expanding beacon service coverage according to an embodiment of the present invention will be described.

Figure 2:
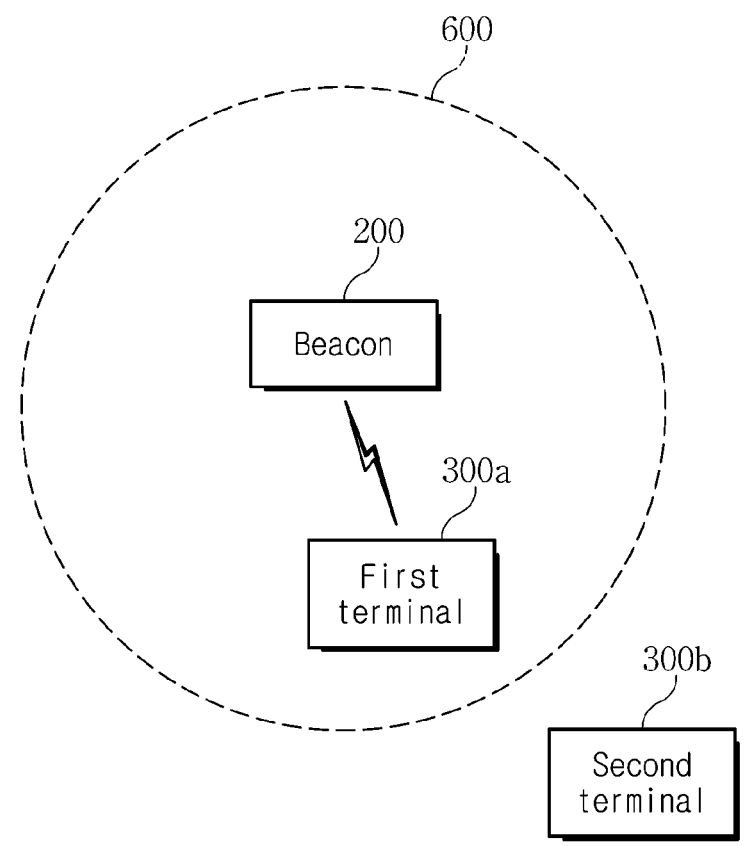
FIGS. 2 to 4 are exemplary diagrams for describing a method of expanding beacon service coverage according to an embodiment of the present invention.
Figure 3:
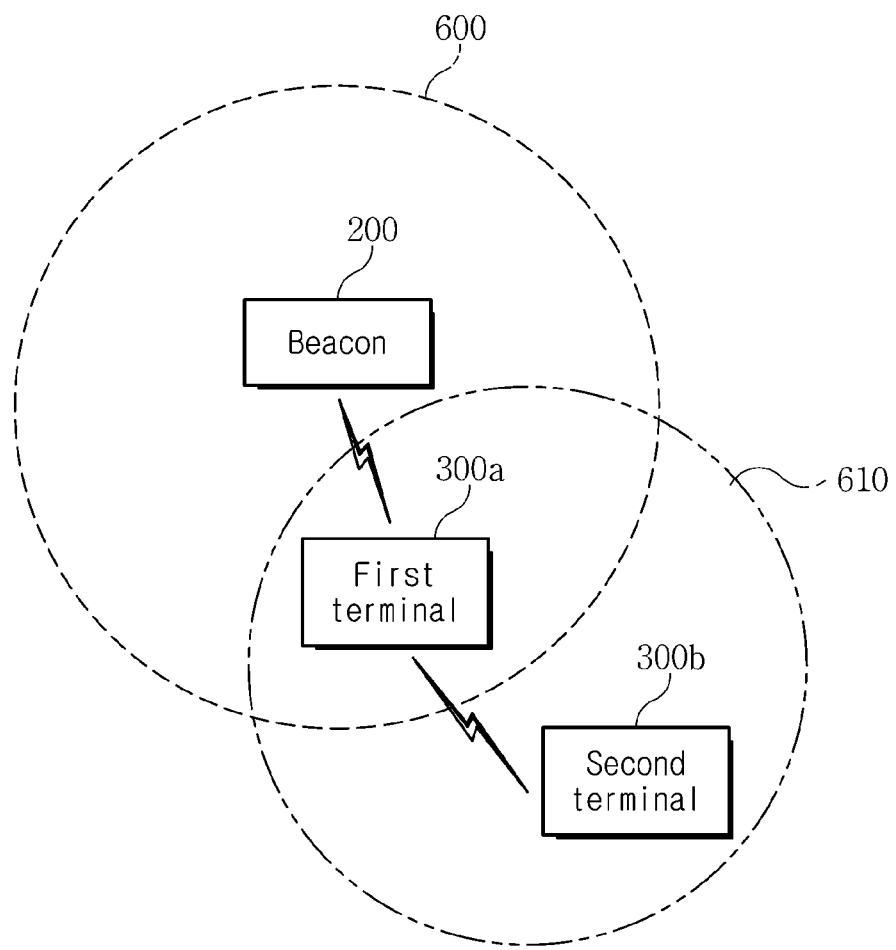
Figure 4:
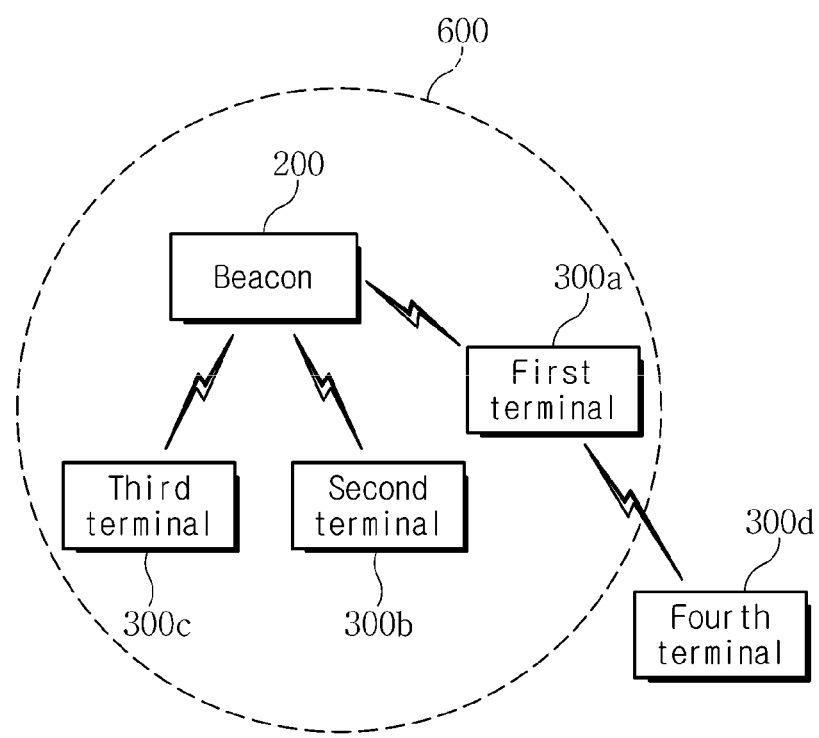

FIG. 1 is a block diagram schematically showing a beacon system according to an embodiment of the present invention, and FIGS. 2 to 4 are exemplary diagrams for describing a method of expanding beacon service coverage according to an embodiment of the present invention.

First, referring to FIG. 1, a beacon system according to an embodiment of the present invention may include a beacon device 200 configured to transmit a beacon signal within a certain service coverage, a user terminal 300 configured to scan and recognize the beacon signal transmitted from the beacon device 200 and connect to the beacon device 200, and a service server 400 configured to manage a plurality of beacon devices 200 and provide a service to the terminal 300.

More specifically, a communication network 100 may be configured to support transmission and reception of data between the terminal 300 and the service server 400, and may use a wired communication method, such as Ethernet, an x digital subscriber line (xDSL) (asymmetric DSL (ADSL), very-high-bot-rate DSL (VDSL)), hybrid fiber coaxial cable (HFC), fiber to the curb (FTTC), and fiber to the home (FTTH) or a wireless communication method, such as wireless local area network (WLAN), wireless fidelity (Wi-Fi), wireless broadband (Wibro), World Interoperability for Microwave Access (Wimax), high speed downlink packet access (HSDPA), long term evolution (LTE), and LTE advanced (LTE-A).

Moreover, the communication network 100 may include, for example, a plurality of access networks (not shown) and core networks (not shown), and may further include an external network, for example, the Internet network (not shown). Here, each of the access networks is an access network that performs wired/wireless communication between the terminal 300 and the beacon device 200 and may include at least one access point (AP) 500. Here, the AP 500 may be implemented as a plurality of base stations (BSs), such as a BS, a base transceiver station (BTS), a NodeB, and an eNodeB, and a BS control device, such as a BS controller (BSC) and a radio network controller (RNC). Also, as described above, a digital signal processing unit and a wireless signal processing unit that are integrally implemented in the BS are separated into a digital unit (hereinafter referred to as a DU) and a radio unit (hereinafter referred to as an RU), respectively. A plurality of RUs (not shown) may be installed in a plurality of regions and may be connected with a centralized DU (not shown). In the drawing, it is shown and described that only the beacon device 200 is connected to the AP 500, but is not limited thereto. The terminal 300 may be directly connected to the communication network 100 through the AP 500 and configured to access the service server 400.

In addition, a core network (not shown) constituting a mobile network along with an access network (not shown)

serves to connect the access network (not shown) with an external network, for example, the Internet network (not shown).

As described above, the core network (not shown) is a network system that performs a main function for mobile communication service of mobility control and switching between access networks (not shown) and is configured to perform circuit switching or packet switching and manage and control packet flow in the mobile network. In addition, the core network (not shown) may serve to manage mobility between frequencies and interoperate between traffic in the access network (not shown) and the core network (not shown) and another network, for example, the Internet network (not shown). The core network (not shown) may further include a serving gateway (SGW), a packet data network (PDN) gateway (PGW), a mobile switching center (MSC), a home location register (HLR), a mobile mobility entity (MME), and a home subscriber server (HSS).

In addition, the Internet network (not show) may denote a typical open communication network through which information is exchanged according to a transmission control protocol/internet protocol (TCP/IP) protocol, that is, a public network, and may be connected with the terminal 300 and configured to provide information provided from the terminal 300 to the service server 400 via the core network (not shown) and the access network (not shown), and also provide information provided to the service server 400 to the terminal 300 via the core network (not shown) and the access network (not shown). However, embodiments of the present invention are not limited thereto. The service server 400 may be implemented integrally with the core network (not shown).

In addition to the above communication schemes, any other communication schemes that are widely known or will be developed in the future may be included.

The beacon device 200 serves to transmit a beacon signal using short-range wireless communication, scan the transmitted beacon signal, and provide a designated service to a terminal being connected to. The beacon device 200 according to an embodiment of the present invention may transmit a beacon signal according to a BLE communication protocol. Also, the beacon device 200 may be installed in an indoor area such as a store and configured to transmit a beacon signal within a radius of about 5 cm to about 49 m. The beacon device 200 is provided with firmware installed therein to process and manage information (e.g., an advertisement, a location-based service, etc.) serviced by the beacon device 200. The firmware program includes information needed to drive the beacon device 200. In this case, the firmware program may be managed and updated by the service server 400.

In addition, the beacon device 200 according to an embodiment of the present invention may be classified into a master beacon that includes both a communication module for transmitting a beacon signal to a terminal positioned within a certain service coverage and a communication module for connecting to the service server 400, and a slave beacon that may be connected to the master beacon and configured to transmit a beacon signal within the certain service coverage. In this case, the slave beacon may be connected to the service server 400 by approaching it according to the control of the master beacon and may also be connected to another master beacon according to system conditions or upon a user's request. On the other hand, the master beacon may be connected to the communication network 100 through the AP 500 and may be configured to transmit or receive information to or from the service server 400 via the communication network 100.

The beacon device 200 periodically transmits a beacon signal within a service coverage. Here, the beacon signal may include beacon identification information such as identification information or location information allocated to the beacon device 200, and the beacon identification information is a criterion for the user terminal 300 to receive a beacon service.

The terminal 300 denotes a user device that may transmit and receive various types of data via the communication network 100 according to a user's manipulation. The terminal 300 may perform voice or data communication through the communication network 100, transmit and receive information to and from the service server 400 through the communication network 100, and receive information from the beacon device 200 through beacon-based communication. For this, the terminal 300 according to an embodiment of the present invention may include a memory that stores programs and protocols for transmitting, receiving, and processing the beacon signal, a microprocessor that executes various types of programs to perform calculation and control, etc.

This terminal 300 may preferentially access an app providing apparatus (not shown) connected to the communication network 100, for example, an app store, receive a beacon signal from the app store, and receive and install a beacon service app showing content corresponding to the beacon signal. At this point, the terminal 300 according to the embodiment of the present invention may execute the beacon service app, scan a certain coverage, and confirm the beacon signal. The terminal 300 may extract beacon identification information from the confirmed beacon signal, transmit the extracted beacon identification information to the service server 400, receive content (e.g., a discount coupon or membership card benefits, etc.) mapped to the beacon identification information from the service server 400, and output the received content.

In order to perform the above operation, the terminal 300 should be positioned within the service coverage of the beacon device 200. When the terminal 300 is not positioned within the service coverage of the beacon device 200, the terminal 300 cannot scan the beacon signal transmitted from the beacon device and cannot use a service provided according to the beacon signal by the service server 400. In order to overcome the above difficulty using another method rather than the method of expanding service coverage of the beacon device 200, the present invention proposes that the terminal 300 should perform a beacon function.

For example, a first terminal 300a may be positioned within the service coverage of the beacon device 200 and configured to scan and receive the beacon signal transmitted from the beacon device 200. At this point, the first terminal 300a measures strength of the beacon signal transmitted from the beacon device 200 and performs the beacon function when the strength of the beacon signal is a predetermined value or less. Then, the first terminal 300a transmits a beacon signal within a certain coverage from the first terminal 300a, and may transmit the beacon signal of the first terminal 300a to a second terminal 300b when the second terminal 300b is positioned within the service coverage of the first terminal 300a. In this case, the beacon signal transmitted by the first terminal 300a may be the same as the beacon signal received from the beacon device 200 and may also additionally include identification information of the first terminal 300a according to the implementation.

The method of expanding beacon service coverage according to an embodiment of the present invention will be described again with reference to FIGS. 2 and 3. As shown in FIG. 2, the first terminal 300a receives a beacon signal transmitted from the beacon device 200 while the first terminal 300a is positioned within a service coverage 600 of the beacon device 200. On the other hand, the second terminal 300b cannot scan and receive the beacon signal transmitted from the beacon device 200 because the second terminal 300b is not positioned within the service coverage 600 of the beacon device 200.

In such a case, conventionally, the beacon device 200 cannot transmit the beacon signal to the second terminal 300b that is not positioned in an area of the beacon device 200. However, according to an embodiment of the present invention, the first terminal 300a may transmit the beacon signal to the second terminal 300b by performing a beacon function.

That is, as shown in FIG. 3, the first terminal 300a may transmit the beacon signal to a second terminal 300b positioned within a certain coverage 610 by performing the beacon function. Here, the first terminal 300a measures strength of the beacon signal transmitted from the beacon device 200, and performs the beacon function when the strength of the beacon signal is the predetermined value or less. In this case, the first terminal 300a may transmit the beacon signal after setting its service coverage 610, and the service coverage 610 of the first terminal 300a may be less than or greater than the service coverage 600 of the beacon device 200. Here, the coverage may vary depending on the state of the first terminal 300a. For example, when the number of programs running on the first terminal 300a is small and thus there are many available resources, the first terminal 300a may set the service coverage to be large. On the other hand, when the number of programs running on the first terminal 300a is large and thus available resources are limited, the first terminal 300a may set the service coverage to be small.

Also, the beacon signal transmitted by the first terminal 300a to the second terminal 300b positioned within the service coverage 610 of the first terminal 300a may be the same as the beacon signal transmitted by the beacon device 200. However, according to an implementation, the first terminal 300a may extract beacon identification information from the beacon signal transmitted by the beacon device 200, form a new beacon signal including identification information of the first terminal 300a, and transmit the new beacon signal to the second terminal 300b.

Thus, the second terminal 300b may scan and confirm the beacon signal transmitted by the beacon device 200 via the first terminal 300a, extract the confirmed beacon identification information from the beacon signal, transfer the extracted beacon identification information to the service server 400, and use a beacon service provided from the service server 400.

On the other hand, when there are a plurality of terminals within the service coverage of the beacon device 200, all of the terminals 300 need not perform the beacon function. Accordingly, a terminal 300 that will perform an optimal beacon function may be selected from among the terminals and controlled to perform the beacon function.

Referring to FIG. 4, it is assumed that the first terminal 300a, the second terminal 300b, and a third terminal 300c are positioned within the service coverage 600 of the beacon device 200. The first terminal 300a, the second terminal 300b, and the third terminal 300c may scan and confirm the beacon signal transmitted from the beacon device 200 because the first terminal 300a, the second terminal 300b, and the third terminal 300c are positioned within the service coverage 600 of the beacon device 200. The first terminal 300a, the second terminal 300b, and the third terminal 300c that receive the beacon signal measure transmission strength of the beacon signal and perform a beacon function when it is determined that the transmission strength of the beacon signal is the predetermined value or less.

In this case, according to an embodiment of the present invention, only a terminal that performs the beacon function first may selectively perform the beacon function. In other words, when the first terminal 300a performs the beacon function first and transmits the beacon signal within a certain service coverage from the first terminal 300a, the second terminal 300b and the third terminal 300c positioned within the coverage may also scan and confirm the beacon signal transmitted by the first terminal 300a. In this case, the beacon signal transmitted from the first terminal 300a may include identification information of the first terminal 300a. Upon receiving the beacon signal, the second terminal 300b and the third terminal 300c may confirm that the beacon signal is transmitted from the first terminal 300a. Thus, the second terminal 300b and the third terminal 300c may determine not to perform the beacon function although the transmission strength of the beacon signal received from the beacon device 200 is the predetermined value or less.

According to another embodiment of the present invention, the second terminal 300b and the third terminal 300c may determine whether to perform the beacon function in cooperation with the service server 400. That is, when the beacon signal transmitted from the beacon device 200 is the predetermined value or less, the first terminal 300a, the second terminal 300b, and the third terminal inquire of the service server 400 about whether to perform the beacon function before performing the beacon function. In this case, the service server 400 may confirm that a corresponding terminal is positioned within the service coverage of the beacon device 200 by transmitting beacon identification information confirmed in the beacon signal.

Since a plurality of terminals 300 inquire of the service server 400 about whether to perform the beacon function, the service server 400 determines the state of the terminal 300 to select an optimal terminal 300 capable of performing the beacon function. For this, the service server 400 may store and manage information about the terminal 300 in advance. In some cases, the service server 400 may inquire of each of the terminals 300 about information on a current state and confirm the current state.

Through the process, the service server 400 may select only one terminal that will perform the beacon function and may transfer a request to perform the beacon function to the selected terminal, for example, the first terminal 300a. In this case, the process of determining the terminal that will perform the beacon function may be achieved through the service server 400 or may be directly performed by the beacon device 200 according to the implementation.

Upon receiving the request, the first terminal 300a may perform the beacon function and transmit a beacon signal within a certain service coverage to transmit the beacon signal to a fourth terminal 300d positioned within the service coverage of the first terminal 300a, eventually causing an effect of expanding the service coverage of the beacon device 200.

Furthermore, the terminal 300 that performs the beacon function periodically scans and checks the beacon signal transmitted from the beacon device 200. When the beacon signal transmitted from the beacon device 200 is no longer scanned, this means that the terminal 300 exits the service coverage of the beacon device 200. Accordingly, the terminal 300 may stop the beacon function to prevent the beacon signal from being transmitted to the fourth terminal 300d.

The terminal 300 according to an embodiment of the present invention may be implemented in various forms. For example, the terminal 300 described in the specification may be a stationary terminal, such as a smart TV and a desktop computer, as well as a mobile terminal, such as a smart phone, a tablet PC, a PDA, a portable multimedia player (PMP), and an MP3 player.

In accordance with the convergence trend of digital devices, there are various modifications of a mobile device, which are too many to enumerate. A unit equivalent to the above-described units may be used as the terminal 300 according to an embodiment of the present invention. As long as any device downloads and installs a beacon service app according to an embodiment of the present invention, the device may be used as the terminal 300 according to an embodiment of the present invention.

The service server 400 may manage the plurality of beacon devices 200, receive a request to provide a service from the terminal 300, and provide information corresponding to the service.

In particular, the service server 400 according to an embodiment of the present invention may receive beacon identification information from the terminal 300, confirm content (e.g., a discount coupon or membership card benefits, etc.) mapped to the beacon identification information, and provide the content to the terminal 300. Furthermore, the service server 400 according to an embodiment of the present invention may serve to receive the content mapped to the beacon identification information and manage the received content in cooperation with a manager terminal or a manager server.

Also, when an inquiry about whether to perform the beacon function is transferred from the plurality of terminals 300, the service server 400 according to an embodiment of the present invention may also perform a process of determining states of the plurality of terminals 300 and selecting a terminal 300 that will perform an optimal beacon function.

The main elements and operating methods of the devices according to an embodiment of the present invention will be described below in more detail. A processor installed in each device according to an embodiment of the present invention may process program commands for executing the method according to an embodiment of the present invention. In one implementation, the processor may be a single-threaded processor. In alternative implementations, the processor may be a multithreaded processor. Furthermore, the processor may also process instructions stored in a memory or a storage device.

Furthermore, the service server 400 according to an embodiment of the present invention may have the same hardware configuration as a typical web server or network server. However, the service server 400 includes a program module implemented using a software language such as C, C++, Java, Visual Basic, Visual C, etc.

A memory installed in each device according to an embodiment of the present invention stores information in the device. In an implementation, the memory is a computer-readable medium. In an implementation, the memory may be a volatile memory unit. In another implementation, the memory may be a non-volatile memory unit. In an implementation, a storage device is a computer-readable medium. In various other implementations, the storage device may include, for example, a hard disk device, an optical disk device, or any other mass storage device.

Main elements and an operating method of the beacon device 200 according to an embodiment of the present invention will be described below.

Figure 5:
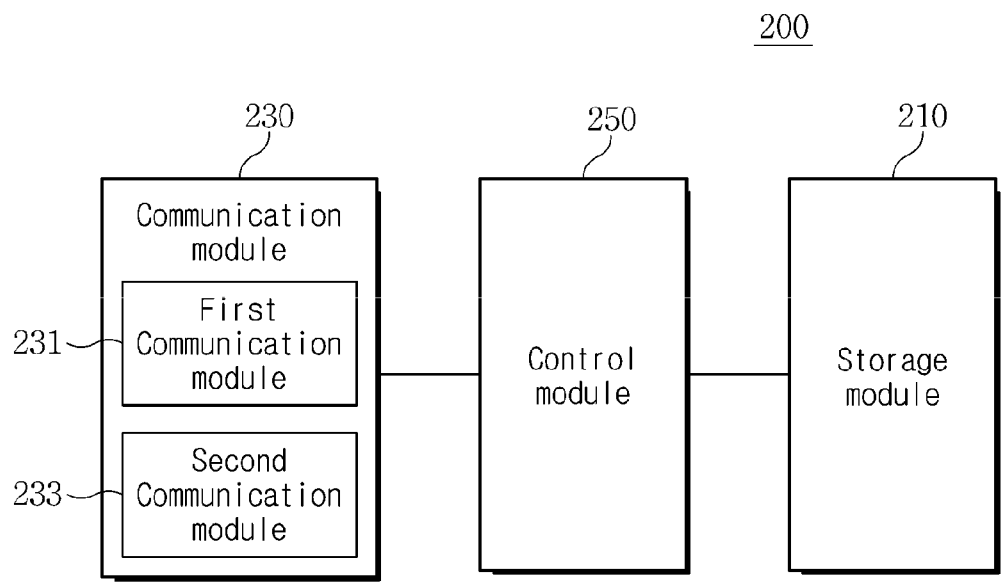
FIG. 5 is a block diagram showing main elements of the beacon device shown in FIG. 1 according to an embodiment of the present invention.

FIG. 5 is a block diagram showing main elements of the beacon device shown in FIG. 1 according to an embodiment of the present invention.

Referring to FIGS. 1 and 5, the beacon device 200 according to an embodiment of the present invention may include a communication module 230, a control module 250, and a storage module 210.

More specifically, the communication module 230 may include a first communication module 231 and a second communication module 233. Here, the first communication module 231 serves to transmit a beacon signal within a certain radius, scan the transmitted beacon signal, and transmit and receive information to and from one or more terminals 300 being connected. In this case, the first communication module 231 may transmit and receive information according to a Bluetooth communication protocol and also may transmit and receive information according to another equivalent communication protocol.

On the other hand, the second communication module 233 is connected to an AP 500 and configured to transmit and receive information to and from the service server 400 via the communication network 100. In this case, the second communication module 233 may transmit and receive information according to a Wi-Fi communication protocol and also may transmit and receive information according to another equivalent communication protocol.

Furthermore, the beacon device 200 according to an embodiment of the present invention may include the first communication module 231 and the second communication module 233 when operating as a master beacon, and may exclude the second communication module 233 when operating as a slave beacon.

The control module 250 performs an overall control of the beacon device 200. In hardware, the control module 250 may include at least one processor including a central processing unit (CPU) or a micro processing unit (MPU), an execution memory (e.g., a register and/or a RAM) in which at least one piece of memory loading data is loaded, and a bus that inputs and outputs at least one piece of data from and to the processor and the memory. In software, the control module 250 may include a predetermined program routine or program data that is loaded from a predetermined recording medium to the execution memory and processed by the processor in order to perform a function defined in the beacon device 200. In other words, an element that may be processed by the software may be determined as a function of the control module among functions included in the beacon device 200 in order to process the method of expanding beacon service coverage according to an embodiment of the present invention.

The control module 250 according to an embodiment of the present invention is functionally connected with at least one element included to support the method of expanding beacon service coverage according to an embodiment of the present invention. That is, the control module 250 is functionally connected with the communication module 230 and the storage module 210 and configured to control the flow of signals to supply power to and perform functions of the elements.

Furthermore, the control module 250 periodically transmits a beacon signal within a certain service coverage through the first communication module 231 of the communication module 230. The control module 250 may be connected with a terminal that transfers a response to the beacon signal, and be configured to control an overall process for providing a designated service to the terminal 300. For example, the terminal 300 may receive content corresponding to the beacon signal through the service server 400. According to the implementation, the beacon device 200 may directly provide content to the connected terminal 300. For this, the control module 250 according to an embodiment of the present invention may support a process of providing the content to the connected terminal 300.

In particular, when an inquiry about whether to perform the beacon function is transferred from the terminal 300 that receives the beacon signal within the service coverage, the control module 250 according to an embodiment of the present invention may select a terminal that will perform the beacon function from among the plurality of terminals 300 and then process a process of requesting the terminal 300 to perform the beacon function.

The storage module 210 may temporarily store an application program needed to operate a function according to an embodiment of the present invention and also a variety of data generated while the application program is running. In particular, the storage module 210 according to an embodiment of the present invention may store and manage content to be provided to the terminal 300. The storage module 210 may include a large program area and data area. The program area stores and manages information needed to operate the beacon device 200. The data area is an area for storing data generated when the beacon device 200 is used, for example, information about the terminal 300 being connected.

The storage module 210 may include a storage medium such as a flash memory, a hard disk, a multimedia card micro type memory (e.g., a secure digital SD or XD memory), a RAM, and a ROM.

The main elements of the beacon device 200 have been described with reference to FIG. 5. However, not all of these elements shown in FIG. 5 are essential. The beacon device 200 may be implemented by more or fewer elements than those shown in FIG. 5.

Also, it should be appreciated that positions of the main elements of the beacon device 200 shown in FIG. 5 may be changed for convenience or other reasons.

Main elements and an operating method of the terminal 300 according to an embodiment of the present invention will be described below.

Figure 6:
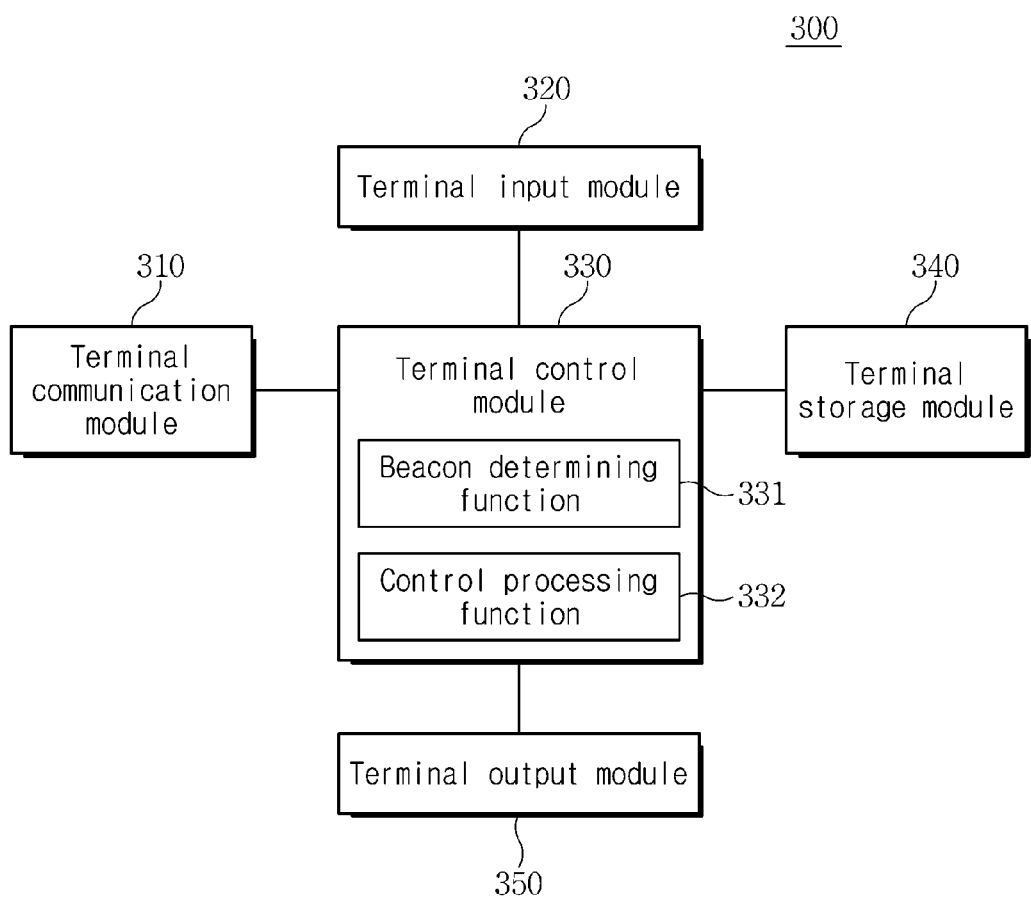
FIG. 6 is a block diagram showing main elements of a terminal shown in FIG. 1 according to an embodiment of the present invention.

FIG. 6 is a block diagram showing main elements of a terminal shown in FIG. 1 according to an embodiment of the present invention.

Referring to FIGS. 1 and 6, the terminal 300 according to an embodiment of the present invention may include a terminal communication module 310, a terminal input module 320, a terminal control module 330, a terminal storage module 340, and a terminal output module 350.

The term "module" used herein may be an element that performs a predetermined function and may be implemented in hardware, software, or a combination thereof. For example, the module may denote a program module, which includes elements that are executed by a processor to perform predetermined functions, such as software elements, object-oriented software elements, class elements, and task elements, and also processes, functions, attributes, procedures, sub-routines, segments of program codes, drivers, data, database, data structures, tables, arrays, and variables. In addition, the functions provided in the elements and the modules may be combined as a smaller number of elements and modules or further divided into additional elements and modules.

The modules constituting the terminal 300 according to an embodiment of the present invention will be described in more detail. First, the terminal communication module 310 may be configured to transmit and receive data to and from the service server 400 through the communication network 100. In addition, the terminal communication module 310 includes a radio frequency (RF) transmitting means that up-converts a frequency of a transmitted signal and amplifies the transmitted signal, an RF receiving means that low-noise-amplifies a received signal and down-converts a frequency of the received signal, a data processing means that processes a communication protocol according to a specific communication scheme, etc. The terminal communication module 310 may include at least one of a wireless communication module (not shown) and a wired communication module (not shown). The wireless communication module is configured to transmit and receive data according to a wireless communication method. When the terminal 300 uses wireless communication, the terminal 300 may use any one of a wireless network communication module, a WLAN communication module, and a wireless PAN communication module to transmit and receive data to and from the service server 400.

Furthermore, the terminal communication module 310 according to an embodiment of the present invention may include a first communication module and a second communication module. The first communication module scans and identifies a beacon signal transmitted from the beacon device 200, connects to the beacon device 200, and functions to transmit and receive information. Here, the first communication module may perform PAN type communication including Bluetooth. Also, the first communication module may serve to transmit the beacon signal according to the control of the terminal control module 330.

On the other hand, the second communication module communicates with the service server 400 through the communication network 100. Here, the second communication module may use a wireless communication scheme such as WLAN, Wi-Fi, Wibro, Wimax, HSDPA, etc.

The terminal input module 320 receives a variety of information, such as number and character information, and transfers a signal received to set various functions and control functions of the terminal 300 to the terminal control module 330. In addition, the terminal input module 320 may include at least one of a keypad and a touchpad, which generate an input signal according to a user's touch or manipulation. In this case, the terminal input module 320 may be configured as one touch panel (or touch screen) together with the terminal output module 350 to simultaneously perform an input function and a display function. Also, the terminal input module 320 may include any type of input means which will be developed in the future in addition to an input device such as a keyboard, a keypad, a mouse, and a joystick. In particular, the terminal input module 320 according to an embodiment of the present invention senses input information that is input from a user and transfers the sensed input information to the terminal control module 330. The terminal input module 320 according to an embodiment of the present invention may support a user input for performing a beacon function. In other words, the beacon function of the terminal 300 according to an embodiment of the present invention may be performed such that a user cannot recognize the beacon function. However, when an acceptance input for performing the beacon function is entered by the user after an output is performed through the terminal output module 350 such that the user can recognize the beacon function, the acceptance input may be received and then transferred to the terminal control module 330.

The terminal control module 330 may be a processing device that drives an operating system (OS) and each element.

Accordingly, the terminal control module 330 of the terminal 300 may control a process for sending a signal received through the terminal input module 320 to the service server 400 through the terminal communication module 310 and may scan a beacon signal through the terminal communication module 310 and receive the scanned beacon signal. Also, the terminal control module 330 may perform control to extract beacon identification information from the beacon signal, transmit the extracted beacon identification information to the service server 400 through the terminal communication module 310, and receive content corresponding to the beacon identification information, and may perform control to store such information or data in the terminal storage module 340.

In particular, the terminal control module 330 according to an embodiment of the present invention may perform a function of expanding beacon service coverage according to an embodiment of the present invention. For this, the terminal control module 330 according to an embodiment of the present invention may perform a beacon determining function 331 and a control processing function 332.

First, when the beacon signal transmitted by the beacon device 200 through the terminal communication module 310 is scanned and detected while the terminal 300 is positioned within the service coverage of the beacon device 200, the beacon determining function 331 measures strength of the beacon signal and controls a process of performing the beacon function when the strength of the beacon signal is the predetermined value or less. In this case, the beacon determining function 331 may determine whether a beacon signal is received from another terminal within a certain radius, and may perform the beacon function when the beacon signal is not received from the other terminal. In addition, when the strength of the beacon signal is the predetermined value or less, the beacon determining function 331 according to an embodiment of the present invention may perform a process of transferring necessary information to the beacon device 200 or the service server 400 such that a terminal for performing the beacon function is determined by the beacon device 200 or the service server 400 rather than the beacon device 200 directly performing the beacon function.

When the terminal communication module 310 transmits the beacon signal according the control of the control processing function 332, the beacon determining function 331 may continuously examine whether the beacon signal transmitted from the beacon device 200 is scanned through the terminal communication module 310. When the beacon signal transmitted from the beacon device 200 is no longer scanned, the beacon determining function 331 may determine to stop the beacon function.

Also, before performing the beacon function, the beacon determining function 331 according to an embodiment of the present invention may inquire of the beacon device 200 or the service server 400 about whether to perform the beacon function and may determine to perform the beacon function when an acceptance response is received.

On the other hand, the control processing function 332 performs an operation needed to expand beacon service coverage according to an embodiment of the present invention. In particular, the control processing function 332 according to an embodiment of the present invention sets a service coverage first when it is determined to perform the beacon function through the beacon determining function 331. Here, the service coverage is set as a certain radius for transmitting a beacon signal. In this case, the service coverage may be set to be large or small in consideration of a resource environment of the terminal.

The control processing function 332 performs control to periodically transmit the beacon signal through the terminal communication module 310. In this case, the control processing function 332 may variably adjust the transmission strength of the beacon signal according to the service coverage to control a process of transmitting the beacon signal. Also, the control processing function 332 may reconstruct the beacon signal to be transmitted by including its own terminal identification information in the beacon signal and may perform control to transmit the reconstructed beacon signal.

The terminal storage module 340 is a device for storing data which includes a main memory device and an auxiliary memory device and stores an application program needed to operate a function of the terminal 300. The terminal storage module 340 may include a large program area and data area. Here, when each function is activated upon a user's request, the terminal 300 executes a corresponding application program under the control of the terminal control module 330 to provide the function. In particular, the terminal storage module 340 according to an embodiment of the present invention may serve to receive content corresponding to the beacon signal from the beacon device 200 or the service server 400, and then store and manage the received content.

The terminal output module 350 displays information about a series of operation states and operation results which are generated while functions of the user terminal 300 are performed. In addition, the terminal output module 350 may display a menu of the terminal 300, user data input by the user, etc. Here, the terminal output module 350 may include a liquid crystal display (LCD), a thin film transistor LCD (TFT-LCD), a light emitting diode (LED), an organic LED (OLED), an active matrix OLED (AMOLED), a retina display, a flexible display, and a three-dimensional (3D) display. In this case, when the terminal output module 350 is configured in the form of a touch screen, the terminal output module 350 may perform some or all of the functions of the terminal input module 320. In particular, according to an embodiment of the present invention, the terminal output module 350 may serve to output content acquired according to the beacon signal.

The elements and the operating method of the terminal 300 according to an embodiment of the present invention have been described above.

A method of expanding beacon service coverage according to an embodiment of the present invention will be described below.

Figure 7:
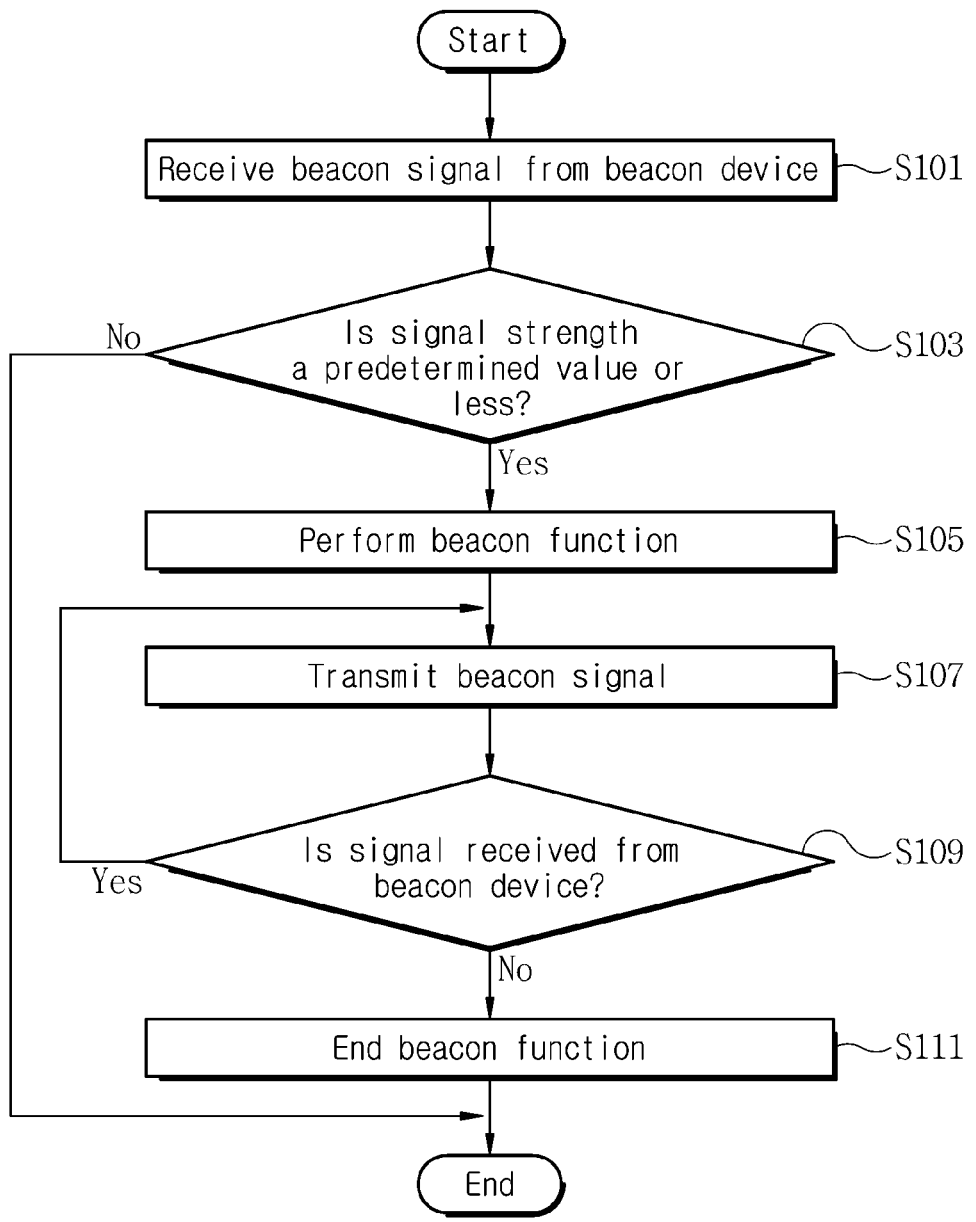
FIG. 7 is a flowchart for describing a method of expanding beacon service coverage according to an embodiment of the present invention.

FIG. 7 is a flowchart for describing a method of expanding beacon service coverage according to an embodiment of the present invention.

Referring to FIG. 7, the terminal 300 scans and receives a beacon signal from at least one beacon device 200 within a certain radius (S101). Here, a procedure of scanning the beacon signal transmitted from the beacon device 200 may be performed according to various well-known procedures. Also, when a plurality of beacon signals are received, the terminal 300 according to the embodiment of the present invention may send a response signal to the beacon device 200 in response to a beacon signal that is selected from among the beacon signals according to a specific criterion.

The terminal 300 measures signal strength of the beacon signal and determines whether the strength of the beacon signal is a predetermined value or less (S103). Here, the predetermined value may be set by the service server 400 and may also be set by a user of the terminal 300.

The terminal 300 performs the beacon function when the signal strength of the beacon signal is the predetermined value or less (S105).

Subsequently, the terminal 300 sets its service coverage and transmits a beacon signal within the set service coverage (S107). Here, the service coverage of the terminal 300 may be larger or smaller than the service coverage of the beacon device 200. In addition, the service coverage set by the terminal 300 may vary depending on the state of the terminal 300. For example, when the number of programs running on the terminal 300 is small and thus there are many available resources, the terminal 300 may set the service coverage to be large. On the other hand, when the number of programs running on the terminal 300 is large and thus available resources are limited, the terminal 300 may set the service coverage to be small. The terminal 300 controls power to transmit the beacon signal according to the set service coverage, and then transmits the beacon signal. In this case, the terminal 300 may transmit the beacon signal transmitted by the beacon device 200 according to the set service coverage. However, according to the implementation, the terminal 300 may extract beacon identification information from the beacon signal transmitted by the beacon device 200, form a new beacon signal including identification information of the terminal 300, and transmit the new beacon signal according to the set service coverage.

Also, the terminal 300 according to the embodiment of the present invention determines whether the beacon signal is periodically received from the beacon device 200 (S109) while the beacon signal is transmitted (S107). When the beacon signal is periodically received from the beacon device 200, the terminal 300 does not move or moves within the coverage of the current beacon device 200. Accordingly, the terminal 300 may continuously perform the beacon function.

On the other hand, when the beacon signal is not received from the beacon device (S109), the terminal 300 determines that the terminal 300 has moved (S109), and ends the beacon function (S111).

Furthermore, according to the embodiment of the present invention, when the terminal 300 performs the beacon function and continuously transmits the beacon signal, the terminal 300 continuously checks its state. When the terminal 300 cannot perform the beacon function, for example, when a specific state occurs, for example, when battery power is equal to or less than 10%, the terminal 300 may stop the beacon function.

Furthermore, according to the method of expanding beacon service coverage according to an embodiment of the present invention, when a plurality of terminals 300 are positioned within the service coverage that is covered by one beacon device 200, each of the terminals 300 may directly and selectively determine whether to perform the beacon function to perform the operation.

This will be described below with reference to FIG. 8.

Figure 8:
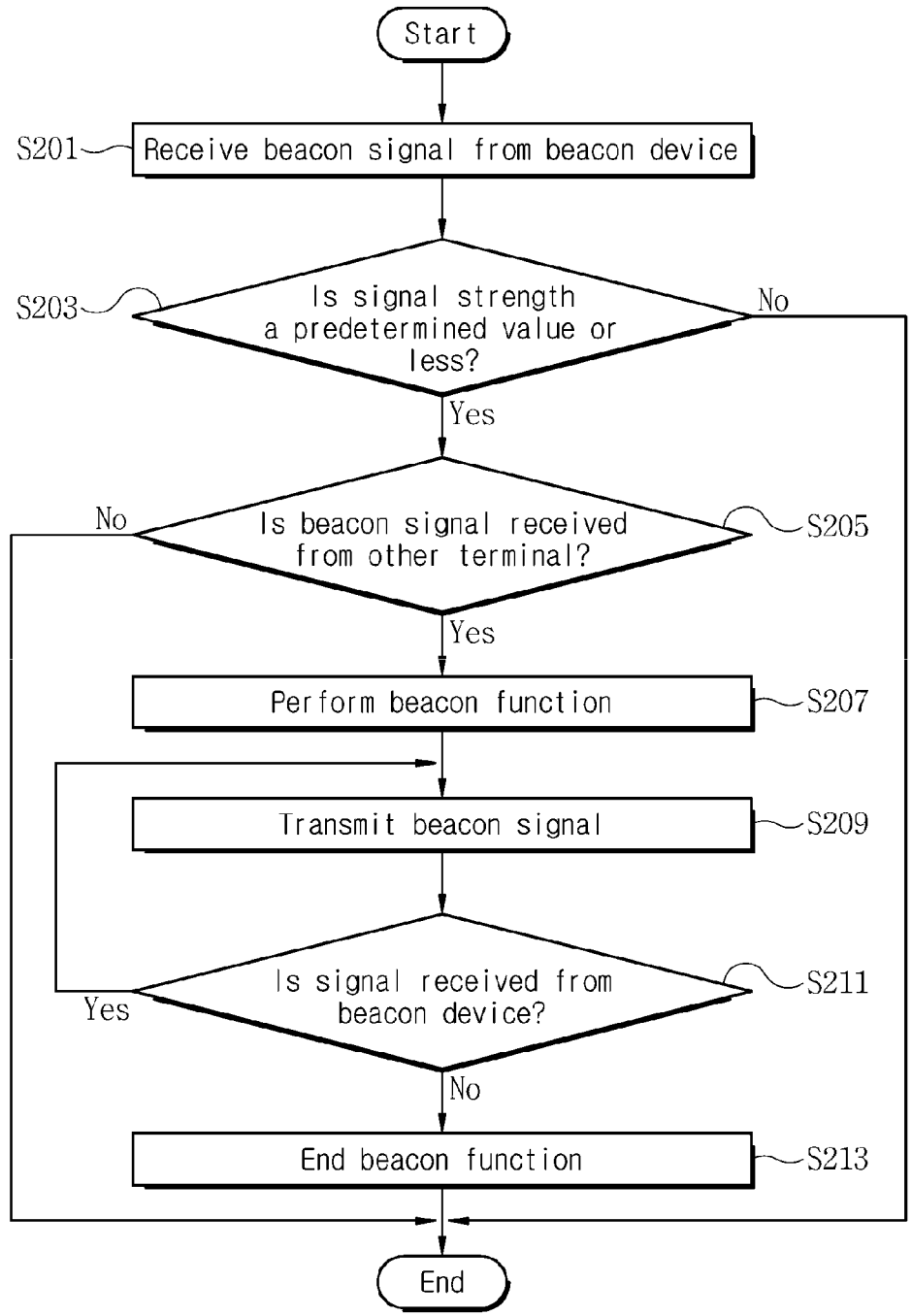
FIG. 8 is a flowchart for describing a method of expanding beacon service coverage according to an embodiment of the present invention in detail.

FIG. 8 is a flowchart for describing in detail a method of expanding beacon service coverage according to an embodiment of the present invention.

Referring to FIG. 8, the terminal 300 scans and receives a beacon signal from at least one beacon device 200 within a certain radius (S201). Here, a procedure of scanning the beacon signal transmitted from the beacon device 200 may be performed according to various well-known procedures. Also, when a plurality of beacon signals are received, the terminal 300 according to the embodiment of the present invention may send a response signal to the beacon device 200 in response to a beacon signal that is selected from among the beacon signals according to a specific criterion.

The terminal 300 measures signal strength of the beacon signal and determines whether the strength of the beacon signal is a predetermined value or less (S203). Here, the predetermined value may be set by the service server 400 and may also be set by a user of the terminal 300.

When the signal strength of the beacon signal is the predetermined value or less, the terminal 300 checks whether a beacon signal is received from another terminal before performing the beacon function (S205). For example, though the signal strength of the beacon signal is the predetermined value or less, the terminal 300 may wait for a predetermined time and determine whether the beacon signal transmitted from the other terminal is scanned. When the beacon signal is not received from the other terminal, the terminal 300 performs the beacon function (S207). On the other hand, when the beacon signal is received from the other terminal, the terminal 300 may end logic for the method of expanding beacon service coverage.

Subsequently, when the terminal 300 determines to perform the beacon function, the terminal 300 sets its own service coverage and transmits a beacon signal within the set service coverage (S209). Here, the service coverage of the terminal 300 may be larger or smaller than the service coverage of the beacon device 200. In addition, the service coverage set by the terminal 300 may vary depending on the state of the terminal 300. For example, when the number of programs running on the terminal 300 is small and thus there are many available resources, the terminal 300 may set the service coverage to be large. On the other hand, when the number of programs running on the terminal 300 is large and thus available resources are limited, the terminal 300 may set the service coverage to be small. The terminal 300 controls power to transmit the beacon signal according to the set service coverage, and then transmits the beacon signal. In this case, the terminal 300 may transmit the beacon signal transmitted by the beacon device 200 according to the set service coverage. However, according to the implementation, the terminal 300 may extract beacon identification information from the beacon signal transmitted by the beacon device 200, form a new beacon signal including identification information of the terminal 300, and transmit the new beacon signal according to the set service coverage.

Also, the terminal 300 according to the embodiment of the present invention determines whether the beacon signal is periodically received from the beacon device 200 (S211) while the beacon signal is transmitted (S209). When the beacon signal is periodically received from the beacon device 200, the terminal 300 does not move or moves within coverage of the beacon device 200. Accordingly, the terminal 300 may continuously perform the beacon function.

On the other hand, when the beacon signal is not received from the beacon device (S211), the terminal 300 determines that the terminal 300 has moved and ends the beacon function (S213).

Furthermore, according to the embodiment of the present invention, when the terminal 300 performs the beacon function and continuously transmits the beacon signal, the terminal 300 continuously checks its state. When the terminal 300 cannot perform the beacon function, for example, when a specific state occurs, for example, when battery power is equal to or less than 10%, the terminal 300 may stop the beacon function.

Moreover, the method of expanding beacon service coverage according to an embodiment of the present invention has described an example in which, when a plurality of terminals 300 are positioned within the service coverage that is covered by one beacon device 200, each of the terminals 300 may directly and selectively determine whether to perform the beacon function. However, embodiments of the present invention are not limited thereto, and any one terminal may be selected from among the plurality of terminals 300 by the beacon device 200 or the service server 400.

A method of selecting one terminal that will perform the beacon function from among the plurality of terminal 300 by the beacon device 200 will be described.

Figure 9:
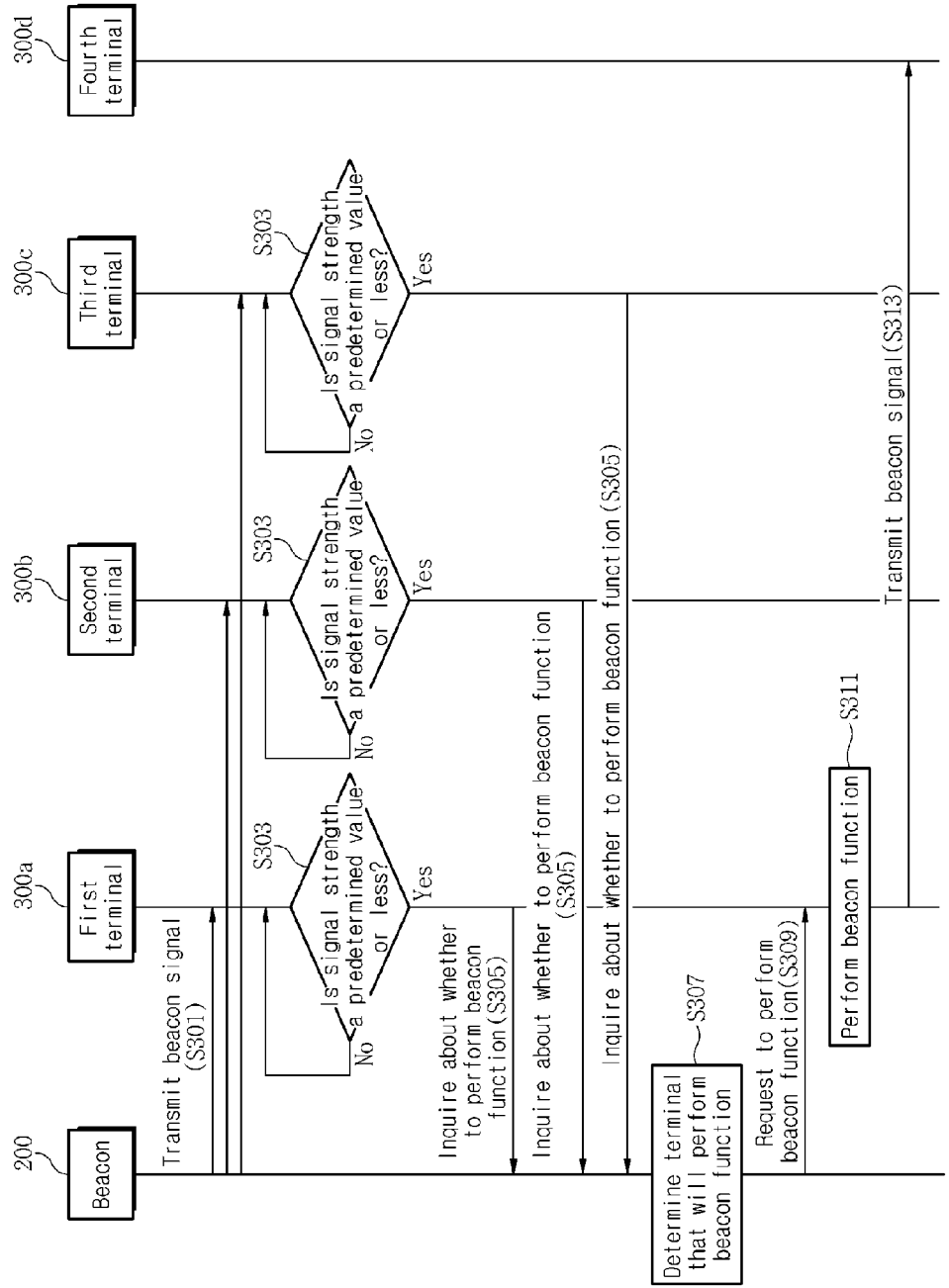
FIG. 9 is a sequence diagram for describing a method of expanding beacon service coverage according to another embodiment of the present invention.

FIG. 9 is a sequence diagram for describing a method of expanding beacon service coverage according to another embodiment of the present invention.

Before the description with reference to FIG. 9, the beacon device 200 transmits a beacon signal within its service coverage. In this case, it is assumed that the first terminal 300a, the second terminal 300b, and the third terminal 300c are positioned within the service coverage of the beacon device 200, but the fourth terminal 300d is not. In this case, the beacon device 200 may periodically transmit the beacon signal (S301). The first terminal 300a, the second terminal 300b, and the third terminal 300c positioned within the service coverage of the beacon device 200 scan and receive the beacon signal transmitted by the beacon device 200. The first terminal 300a, the second terminal 300b, and the third terminal 300c may measure signal strength of the received beacon signal and determine whether the signal strength is a predetermined value or less (S303). The determination process may be performed simultaneously or sequentially.

When the determination result is that the signal strength of the beacon signal is the predetermined value or less, the first terminal 300a, the second terminal 300b, and the third terminal 300c inquire of the beacon device 200 about whether to perform the beacon function (S305). In this case, each terminal may additionally transmit its state information to the beacon device 200.

Upon receiving the state information, the beacon device 200 uses the received state information to determine whether to perform the beacon function (S307). For example, when the beacon device 200 determines that the first terminal 300a is a terminal that will perform the beacon function, the beacon device 200 may request the first terminal 300a to perform the beacon function (S309), and the first terminal 300a may perform the beacon function (S311). That is, the first terminal 300a sets its service coverage according to its own situation and transmits a beacon signal according to a corresponding transmission power (S313). The fourth terminal 300d positioned in the service coverage of the first terminal 300a may receive the beacon signal transmitted from the first terminal 300a, and use a service provided by the beacon device 200. In this case, the first terminal 300a performs the beacon function to transmit the beacon signal. When a response to the beacon signal is not received, the first terminal 300a may operate in a flexible manner, for example, by further expanding the service coverage.

Furthermore, on a condition that the method of expanding beacon service coverage according to an embodiment of the present invention is performed in cooperation with the service server 400, when the beacon signal transmitted from the beacon device 200 is the predetermined value or less, the first terminal 300a, the second terminal 300b, and the third terminal 300c inquire of the service server 400 about whether to perform the beacon function before performing the beacon function. In this case, the service server 400 may confirm that a corresponding terminal is positioned within the service coverage of the beacon device 200 by transmitting beacon identification information confirmed in the beacon signal.

Since a plurality of terminals 300 inquire of the service server 400 about whether to perform the beacon function, the service server 400 determines the state of the terminal 300 to select an optimal terminal 300 capable of performing the beacon function. For this, the service server 400 may store and manage information about the terminal 300 in advance. In some cases, the service server 400 may inquire of each of the terminals 300 about information on a current state and confirm the current state.

Through the process, the service server 400 may select only one terminal that will perform the beacon function and may transfer a request to perform the beacon function to the selected terminal, for example, the first terminal 300a. Upon receiving the request, the first terminal 300a may perform the beacon function and transmit the beacon signal within a certain service coverage to transmit the beacon signal to the fourth terminal 300d positioned within the service coverage of the first terminal 300a, eventually causing an effect of expanding the service coverage of the beacon device 200.

Furthermore, the first terminal 300a that performs the beacon function periodically scans and checks the beacon signal transmitted from the beacon device 200. When the beacon signal transmitted from the beacon device 200 is no longer scanned, this means that the terminal 300 exits the service coverage of the beacon device 200. Accordingly, the terminal 300 may stop the beacon function to prevent the beacon signal from being transmitted to the fourth terminal 300d.

The method of expanding beacon service coverage according to an embodiment of the present invention may be provided in the form of a computer-readable medium suitable for storing computer program instructions and data. Programs recorded in a recording medium for implementing the method of expanding beacon service coverage using a terminal according to an embodiment of the present invention may execute steps of receiving a beacon signal transmitted from a beacon device, measuring signal strength of the beacon signal to determine whether to perform a beacon function, and transmitting the beacon signal within a certain service coverage when the terminal determines to perform the beacon function.

The above-mentioned functions may be executed in a computer by reading, installing, and executing the programs recorded in the computer-readable medium.

Here, in order for the computer to read the programs recorded in the recording medium and execute functions implemented with the programs, the above-mentioned programs may include codes which are coded with computer languages such as C, C++, JAVA, machine language, and the like which may be read by a processor (a CPU) of the computer through a device interface of the computer.

The codes may include a function code associated with a function defining the above-mentioned functions and may also include an execution-procedure-related control code needed for the processor of the computer to execute the above-mentioned functions according to a predetermined procedure. In addition, the codes may further include a memory-reference-related code indicating which location (address number) of the memory inside or outside the computer needs to be referenced for additional information or media needed for the processor of the computer to execute the above-mentioned functions. Further, in order for the processor of the computer to execute the above-mentioned functions, when the processor needs to communicate with any other computers or servers, etc. at a remote location, the codes may further include a communication-related code about how the processor of the computer communicates with any other computers or servers at a remote location or which information or media the processor of the computer transmits and receives at the time of the communication, by using the communication module of the computer.

Examples of the computer-readable medium suitable for storing computer program instructions and data include a magnetic medium such as a hard disk, a floppy disk, and a magnetic tape, an optical medium such as a compact disk ROM (CD-ROM), a digital video disk (DVD), etc., a magneto-optical medium such as a floptical disk, and a semiconductor memory such as a ROM, a RAM, a flash memory, an EPROM, and an electrically erasable PROM (EEPROM). A processor and a memory may be supplemented by a specific purpose logic circuit or integrated into a specific purpose logic circuit.

The computer-readable recording medium can also be distributed over network coupled computing systems so that the computer-readable code is stored and executed in a distributed fashion. In addition, a functional program for implementing the present invention, a code and a code segment associated therewith, and the like may be easily inferred or changed by programmers in the art to which the present invention pertains in consideration of a system environment of the computer which reads the recording medium and executes the program.

Each step of the method according to embodiments of the present invention may be implemented with computer-readable instructions and executed by a computing system. Here, a "computing system" is defined as one or more software modules, one or more hardware modules, or combinations thereof that work together to perform operations on electronic data. For example, the definition of "computing system" includes the hardware components of a PC as well as software modules, such as the OS of the PC. The physical layout of the modules is not important. A computing system may include one or more computers coupled via a network.

Likewise, a computing system may include a single physical device in which internal modules such as a memory and processor work together to perform operations on electronic data.

That is, an apparatus for supporting expansion of the beacon service coverage according to an embodiment of the present invention may be implemented to perform the above-described embodiments on the basis of a computing system which will be described below.

FIG. 10 is a view showing an operating environment of an apparatus for supporting expansion of beacon service coverage according to an embodiment of the present invention.

FIG. 10 and the following discussion are intended to provide a brief, general description of a suitable computing environment in which the present invention may be implemented. Although not required, the invention will be described in the general context of computer-executable instructions, such as program modules, being executed by computing systems. Generally, the program modules include routines, programs, objects, components, data structures, and the like, which perform particular tasks or implement particular abstract data types. Computer-executable instructions, associated data structures, and program modules represent examples of the program code means for executing acts of the methods disclosed herein.

Referring to FIG. 10, an example computing system for implementing the invention includes a computing device including a processing unit 11, a system memory 12, and a system bus 10 that couples various system components including the system memory 12 to the processing unit 11.

The processing unit 11 may execute computer-executable instructions designed to implement features of the present invention.

The system bus 10 may be any of several types of bus structures including a memory bus or memory controller, a peripheral bus, and a local bus using any of a variety of bus architectures. The system memory 12 includes a ROM 12a and a RAM 12b. A basic input/output system (BIOS) 13a, containing the basic routines that help transfer information between the elements within the computing system, such as during start-up, may be stored in the ROM 12a.

The computing system may include a storage device including, for example, a hard disk drive 15 for reading information from or writing information to a hard disk, a magnetic disk drive 16 for reading information from and writing information to a magnetic disk, and an optical disk drive 17 for reading information from or writing information to an optical disk, such as, for example, a CD-ROM or other optical media. The hard disk drive 15, the magnetic disk drive 16, and the optical disk drive 17 are connected to the system bus 10 by a hard disk drive interface 18, a magnetic disk drive interface 19, and an optical drive interface 20, respectively.

In addition, the computing system may be further provided with an external memory 21 as the storage device. The external memory 21 may be connected to the system bus 10 through an input/output interface 24.

The drives and their associated computer-readable media provide nonvolatile storage of computer-executable instructions, data structures, program modules, and other data. Although the example environment described herein employs the hard disk drive 15, the magnetic disk drive 16 and the optical disk drive 17, other types of computer-readable media for storing data may be used, including magnetic cassettes, flash memory cards, DVDs, Bernoulli cartridges, RAMs, ROMs, and the like.

Program code means including one or more program modules may be stored in the hard disk drive 15, the magnetic disk drive 16, the optical disk drive 17, the ROM 12a, or the RAM 12b, and include an OS 13b, one or more application programs 13c, other program modules 13d, and program data 13e, which are loaded and executed by the processing unit 11.

Moreover, a user may enter commands and information into the computing system through a keyboard, a pointing device, or other input devices 22, such as, for example, a microphone, a joystick, a game pad, a scanner, or the like. These input devices 22 may be connected to the processing unit 11 through the input/output interface 24 coupled to the system bus 10. The input/output interface 24 logically represents any of a wide variety of possible interfaces, such as a serial port interface, a PS/2 interface, a parallel port interface, a Universal Serial Bus (USB) interface, or an Institute of Electrical and Electronics Engineers (IEEE) 1394 interface (i.e., a FireWire interface), or may even logically represent a combination of different interfaces.

In addition, the computing system according to an embodiment of the present invention may further include a display device 26 such as a monitor or LCD and an audio device 27 such as a speaker or microphone. The display device 26 and the audio device 27 are connected to the system bus 10 through a video/audio interface 25. For example, other peripheral devices (not shown), such as, for example, speakers and printers, may also be connected to the computing system. The video/audio interface 25 may include a High Definition Multimedia Interface (HDMI), a Graphics Device Interface (GDI), etc.

In addition, the computing system is connectable to networks, such as, for example, an office-wide or enterprise-wide computer network, a home network, an intranet, and/or the Internet. The computing system may exchange data with external sources, such as, for example, remote computing systems, remote applications, and/or remote databases over such networks.

The computing system according to an embodiment of the present invention includes a network interface 28, through which the computing system receives data from external sources and/or transmits data to external sources.

According to an embodiment of the present invention, the computing system may transmit information to or receive information from a device located in a remote position through the network interface 28. For example, when the computing system denotes the terminal 300, the computing system may transmit information to or receive information from the beacon device 200 through the network interface 28. On the other hand, when the computing system denotes the beacon device 200, the computing system may transmit information to or receive information from the terminal 300 through the network interface 28. The network interface 28 may logically represent one or more software and/or hardware modules, such as, for example, a network interface card and a corresponding Network Driver Interface Specification (NDIS) stack.

Likewise, the computing system receives data from external sources and/or transmits data to external sources through the input/output interface 24. The input/output interface 24 may be coupled to a modem 23 (e.g., a standard modem, a cable modem, or a DSL modem), through which the computing system receives data from and/or transmits data to external sources.

While FIG. 10 represents an operating environment suitable for the present invention, the principles of the present invention may be employed in any system that is capable of, with suitable modification when necessary, implementing the principles of the present invention. The environment illustrated in FIG. 10 is illustrative only and by no means represents even a small portion of the wide variety of environments in which the principles of the present invention may be implemented.

Moreover, a messenger program and a variety of information that is generated when the messenger program according to an embodiment of the present invention is executed may be stored in and accessed by any computer-readable media associated with the computing system as shown in FIG. 10. For example, portions of such program modules and portions of associated program data may be included in the OS 13b, the application programs 13c, the program modules 13d, and/or the program data 13e for storage in the system memory 12.

When a mass storage device, such as, for example, a hard disk, is coupled to the computing system, such program modules and associated program data may also be stored in the mass storage device. In a networked environment, program modules associated with the present invention or portions thereof may be stored in remote memory storage devices, such as, for example, a system memory and/or mass storage devices associated with a remote computer system connected through the modem 23 of the input/output interface 24 or the network interface 28, for example, computing systems of the terminal 300 and the beacon device 200. As described above, execution of such modules may be performed in a distributed environment.

The specification includes details of a number of specific implements, but it should be understood that the details do not limit the invention or what is claimable in the specification but rather describe features of the specific embodiment. Features described in the specification in the context of individual embodiments may be implemented as a combination in a single embodiment. In contrast, features described in the specification in the context of a single embodiment may be implemented in multiple embodiments individually or in an appropriate sub-combination. Furthermore, the features may operate in a certain combination and may be initially described as claimed in the combination, but one or more features may be excluded from the claimed combination in some cases, and the claimed combination may be changed into a sub-combination or a modification of a sub-combination.

Similarly, even though operations are described in a certain order on the drawings, it should be understood that the operations do not need to be executed in the certain order or in a sequential order to obtain desired results, or that all the operation need to be executed. In some cases, multitasking and parallel processing may be beneficial. In addition, it should be understood that the separation of various system components in the above described embodiments is not required in all embodiments, and it should be understood that the above described program components and systems may be incorporated into a single software product or may be packaged in multiple software products.

Thus, particular embodiments have been described. Other embodiments are within the scope of the following claims. For example, the operations cited in the claims may be performed in a different order and still achieve desirable results. As an example, operations depicted in the drawings in a particular order is not to be understood as requiring that such operations be performed in the particular order shown or in sequential order. In a certain embodiment, a multitasking and a parallel processing may be beneficial.

This written description sets forth the best mode of the invention and provides examples to describe the invention and to enable a person of ordinary skill in the art to make and use the invention. The specification drafted as such is not limited to detailed terms suggested in the specification. Accordingly, it should be apparent to those skilled in the art that various modifications, changes, and variations may be made in the example without departing from the scope of the invention.

Accordingly, the scope of the present invention should be defined not by the embodiments but by the claims.

INDUSTRIAL APPLICABILITY

The present invention relates to a method of expanding beacon service coverage, and more particularly, to a beacon service coverage expanding method that may expand beacon service coverage by using a user terminal to perform a beacon function to transmit a beacon signal within a certain coverage, and an apparatus and system therefor.

According to an embodiment of the present invention, it is possible to expand beacon service coverage using a user terminal without increasing the number of beacon devices or increasing transmission strength of a beacon device by the user terminal performing a beacon function to transmit a beacon signal within a certain coverage instead of the beacon device.

Moreover, the present invention has industrial applicability in that the possibility of sales or business is sufficient and also the present invention may actually be carried out.

What is claimed is:

1. A method of expanding beacon service coverage using a terminal, the method comprising:
    measuring, at a terminal, signal strength of a beacon signal transmitted from a beacon device to determine whether the terminal is to perform a beacon function according to the measured signal strength of the beacon signal;
    transmitting a beacon signal within a certain service coverage responsive to the terminal determining to perform the beacon function;
    checking whether the beacon signal is received from the beacon device; and
    stopping transmission of the beacon signal when the beacon signal is not received from the beacon device,
    wherein the determining of whether the terminal performs a beacon function comprises:
        determining whether the measured signal strength of the beacon signal is a predetermined value or less; and
        determining to perform the beacon function when the measured signal strength of the beacon signal is at the predetermined value or less, and determining not to perform the beacon function when the measured signal strength of the beacon signal is not less than the predetermined value, and
    wherein the transmitting of the beacon signal within the certain service coverage comprises:
        setting the certain service coverage according to a state of the terminal; and
        transmitting the beacon signal while adjusting signal strength of the beacon signal according to the certain service coverage.

2. The method of claim 1, wherein the determining of whether the terminal is to perform the beacon function comprises determining not to perform the beacon function by the terminal responsive to a beacon signal including the same beacon identification information as that of the beacon signal transmitted from the terminal is received from another terminal.

3. The method of claim 1, wherein the determining of whether the terminal is to perform the beacon function comprises:
    inquiring of the beacon device or a service server about whether to perform the beacon function, by the terminal; and
    determining to perform the beacon function responsive to receiving a request to perform the beacon function from the beacon device or the service server, and determining not to perform the beacon function when the request to perform the beacon function is not received from the beacon device or the service server.

4. The method of claim 1, further comprising, after the transmitting of a beacon signal within the certain service coverage, confirming information on a current state of the terminal, and stopping the beacon function responsive to determining that the beacon function cannot be performed based on a current state of the terminal.

5. A terminal comprising:
    a terminal communication circuit configured to scan and detect a beacon signal transmitted from a beacon device positioned within a certain service coverage; and
    a terminal control module configured to measure signal strength of a received beacon signal to determine to perform a beacon function by the terminal responsive to the beacon signal transmitted from the beacon device is received through the terminal communication circuit, set a service coverage according to a state of the terminal to, transmit a beacon signal while adjusting signal strength of the beacon signal according to the certain service coverage responsive to determining that the terminal is to perform the beacon function, check whether the beacon signal is received from the beacon device, and stop transmission of the beacon signal responsive to not receiving the beacon signal from the beacon device.

6. A beacon system comprising:
    a beacon device configured to transmit a beacon signal to a terminal positioned within a certain service coverage;
    a plurality of terminals each configured to measure signal strength of a received beacon signal to determine to perform a beacon function responsive to receiving the beacon signal, transmit a beacon signal within a certain service coverage when the terminal determines to perform the beacon function, set a service coverage according to a state of the terminal to transmit a beacon signal while adjusting signal strength of the beacon signal according to the set service coverage, check whether the beacon signal is received from the beacon device, and stop transmission of a beacon signal when the beacon signal is not received from the beacon device; and
    a service server configured to determine a terminal that will perform the beacon function from among the plurality of terminals and notify the determined terminal, wherein, each of the plurality of terminal measures the signal strength of the received beacon signal and inquires of the service server about whether to perform the beacon function when the signal strength is a predetermined value or less, and
    the service server checks states of the plurality of terminals, determines a terminal that will perform the beacon function, and notifies the determined terminal.

* * * * *